United States Patent [19]
Travaglini

[11] Patent Number: 5,639,490
[45] Date of Patent: Jun. 17, 1997

[54] INJECTOR WITH LOCKING NOZZLE

[75] Inventor: Vince Travaglini, Etobicoke, Canada

[73] Assignee: Tradesco Mold Limited, Rexdale, Canada

[21] Appl. No.: 474,886

[22] Filed: Jun. 7, 1995

[51] Int. Cl.$^6$ ............................................. B29C 45/20
[52] U.S. Cl. ............................ 425/549; 264/328.15
[58] Field of Search .................... 425/549; 264/328.15

[56] References Cited

U.S. PATENT DOCUMENTS

| | | | |
|---|---|---|---|
| 5,269,676 | 12/1993 | Gellert | 425/549 |
| 5,501,594 | 3/1996 | Glozer et al. | 425/549 |

*Primary Examiner*—Tim Heitbrink
*Attorney, Agent, or Firm*—Caesar, Rivise, Bernstein, Cohen & Pokotilow, Ltd.

[57] ABSTRACT

The nozzle tip of an injection mold, which admits plastic at high injection pressures and temperatures to the gate of the mold, is locked on its seat within the nozzle housing by way of an axially elongated bridging key arrangement, to lock the nozzle tip to the nozzle housing and preclude backing-off movement of the nozzle tip into the gate. This prevents the nozzle tip from moving to block or partially block-off the gate. By securely locking the nozzle tip, potential damage to the mold gate is avoided. A singular keyway comprising aligned keyway portions may be provided, in mutual radial facing relation, to receive an elongated key therein. A differentiated nozzle tip locking embodiment provides two annular arrays of complementary keyway halves in mutual facing relation, forming potential insertion keyways in differentiated matching relation to provide one almost perfect match-up between two halves of a keyway, for insertion of a tubular spring pin as a key in locking relation therein. Adjacent pairs of potential keyway halves may be in progressive near alignment, so as to ensure a near-perfect keyway alignment match-up, thereby enabling the insertion of a key, such as a locking pin member, to maintain the nozzle tip in a screwed-home condition.

12 Claims, 1 Drawing Sheet

INJECTOR WITH LOCKING NOZZLE

TECHNICAL FIELD

This invention is directed to an injector for an injection mold, and in particular to a nozzle assembly having the nozzle tip thereof positively locked to the nozzle housing. This invention also includes the associated mold.

BACKGROUND TO THE INVENTION

Injection molding is carried out in molding presses that serve to hold the components forming the cavity mold in secured, sealed relation, to receive hot, molten plastic injected at pressures in the order of twenty thousand pounds per square inch. The molten plastic is injected through an injector nozzle assembly that abuts the mold cavity at the gate of the mold cavity. Each injector has a replaceable nozzle tip that cooperates thermally with the gate, and through which the plastic is forced.

The requirement for successful molding is that the gate land, that zone of the mold surrounding the gate, be kept cold, by circulating cooling water, while the nozzle tip is maintained above the solidification temperature of the plastic, by the passage of the hot plastic therepast, and by the operation of electric nozzle heaters.

At the end of each injection cycle, the injected plastic solidifies in the mold, including the plastic in the gate, in the form of a slug. Upon opening of the mold the molded article breaks away from the gate and the slug, upon ejection, leaving the severed slug attached to the gate land, in blocking relation with the gate.

When the mold recloses for the next cycle, under design conditions the injection pressure is sufficient to displace the slug into the mold, where it remelts into the plastic stream. However, in the event that the nozzle tip temperature is lowered below a desired minimum level, the degree of plastic solidification can extend so as to freeze the plastic in the gate zone to such an extent that the slug builds up around the gate land and can no longer be displaced into the mold cavity during the succeeding injection cycle, so that defective injection occurs, or injection is totally blocked.

Thus it will be seen that thermal conditions at the nozzle can be critical, and require to be maintained as close to ideal as possible.

In the event that the nozzle tip partially unscrews during molding, it will move towards the gate. This results in:
1. Disturbance of thermal conditions in the mold;
2. Partial or complete blocking of the gate, usually by extended "freezing" of plastic before the gate.

These conditions lead to "short shots", ie. partial filling of the mold and a totally defective product.

In one arrangement of injector nozzles the nozzle housing is seated in sealing relation within a nozzle cavity adjacent the gate.

The injector nozzle has a centrally located, axially protruding nozzle tip through which the injected plastic passes into the adjoining gate orifice. In the event that the injector nozzle backs off from its seat, upon its securing threads, it moves further into the gate, thus restricting or even blocking-off the gate.

Such backing off of an injector nozzle tip is highly undesirable, and necessitates the termination of molding operation, including the shutting down of the press, the stripping down of the mold to access the nozzle tip, and includes the removal of a mass of solidified plastic, and any other required remedial action on the defective assembly.

The immobilization of this type of injector nozzle tip against such backing-off, in order to prevent molding failure has proved to be difficult to achieve. Due to the close space limitations imposed by the environment within the mold, coupled with the imperative need to maintain balanced nozzle tip thermal conditions and geometry, allied with the varying temperatures required for different melts, and the extremely high injection pressure of the hot plastic, an effective nozzle tip locking means has proved to be elusive, and the problem of nozzle back-off is recurrent.

In the case of a multi-cavity mold, where the flow symmetry and balanced flow conditions are usually of vital importance, the backing-off malfunction of one nozzle tip almost inevitably unbalances the flow of plastic to the remaining cavities, with consequent shorts and/or flashing due to "over packing" being produced by them also.

Included in any prior attempts to deal with this problem are:

1. Building-up of the male thread profile of the nozzle tip by a plating or coating such as chrome or nickel plating;
2. The insertion of a locking set-screw against the side of the nozzle tip;
3. Applying two different thread forms to the nozzle tip, to ensure jamming of the threads;
4. Using a different type of material, such as H13 tool steel instead of the more usual copper-beryllium alloy; but this can lead to seizing of the nozzle tip threads to the nozzle housing, or freezing of plastic in the gate due to lower thermal conductivity.

One present practice is to torque home the nozzle tip in controlled jamming relation in the nozzle housing, with varying success.

Another approach, the provision of thermoset plastic spacers attached to the outer end of the nozzle tip, to bear against the land that defines the mold gate, is costly, and the spacers are prone to damage during routine set-up and maintenance.

Other mechanical design solutions which tend to disturb the necessary delicate thermal balance at the nozzle tip have proved to be unacceptable.

DISCLOSURE OF THE INVENTION

The present invention provides a mold having an injector nozzle assembly to inject molten plastic therethrough, the injector nozzle assembly comprising:

an elongated nozzle housing having an internally threaded hollow barrel for passage of the plastic;

a hollow injector nozzle tip, having a threaded body portion located within the barrel for securing the nozzle tip in coaxial threaded relation in the barrel, a portion of the nozzle tip within the barrel having a radial clearance from the barrel, the nozzle tip extending outwardly beyond the nozzle housing;

composite keyway means having at least one first keyway recess portion in the barrel located in inward facing relation with the nozzle tip;

at least one second keyway recess portion in the nozzle tip in facing relation with the at least one first recess portion, the first and second recess portions when in substantial aligned relation forming a composite keyway to receive a key member in close fitting inserted relation therein, to immobilize the nozzle tip in relation to the nozzle housing.

In such an instance it is generally contemplated that the nozzle tip is bottomed-out on its threads and against the nozzle housing when the two recess portions are in sufficiently aligned relation, the so-called "match-up" position, to permit insertion of the key in locking relation between the nozzle housing and the nozzle tip. The respective recess portion, or a plurality of such recess portions may each be shaped in a variety of cross sections, and the shape and style of the key may comprise a variety of cross-sectional forms and materials.

Thus, the facing, composite keyway portions may each be of rectangular section, to receive a key of suitable section inserted therein, to lock the nozzle housing and nozzle tip together.

Another composite keyway arrangement may comprise an outer (barrel) recess of inward facing cross-section such as a segment of a circle, with the complementary facing portion of the recess comprising a chord of a circle. This chord may be a single flat, or one of the flats of a pentagon, such as a six or a twelve point hexagon.

In such an arrangement, misalignment of one portion of the composite recess with the other portion diminishes the cross-section of the composite keyway, to thereby impede or preclude the insertion of a locking key therein. Correspondingly, the presence of a close fitting key precludes such misalignment, thereby preventing rotation of the nozzle tip relative to the barrel, so as to prevent back-off of the nozzle tip towards the adjacent gate.

A suitable key may comprise a hollow tubular spring pin of appropriate diameter to provide a snug push fit in sliding relation with the two complementary keyway portions when they are in substantial mutual register, thereby retaining the nozzle tip in secured, non-rotatable relation with the nozzle housing.

The hollow tubular spring pin provides adequate mechanical strength, ease of assembly and disassembly, regularity of geometry, low thermal conductivity and an off-the-shelf, low cost key possessing a degree of tolerance for slight keyway misalignments when the composite keyway elements are in substantial match-up alignment.

It is contemplated that the insertable key may be of a suitable plastic such as a thermoset or an engineering plastic having the required physical properties such as elasticity, engineering strength, high melting point, low thermal conductivity, etc. to provide the required functions.

Another composite keyway provision may comprise a peripheral array of first keyway portions recessed into the inward facing inner face of the nozzle barrel. A facing array of complementary keyway second "recesses" located on the facing outer surface of the nozzle tip may comprise the flats portions of a plane sided figure, such as a 12-point hexagon.

The respective number of component parts of the composite keyway may be selected to yield a mathematical angular combination such that the extent of keyway alignment progresses from site to site of the facing keyway elements, and one substantially true keyway registry or match-up is assured.

The flats of the nozzle tip polygon may extend beyond the nozzle barrel, the portion thereof located beyond the end of the barrel providing a gripping head portion to the machine operator, for installing and removing the nozzle tip.

The spacing of the barrel recesses may be in predetermined mutual asymmetrical relation about the inner periphery of the barrel to create a differentiated relationship between the radially inner and the outer keyway elements that cooperate to form the walls of each potential keyway, so that match-up of the two components of a composite keyway is promoted.

The substitution for the flats of a pentagon by other profiles, for the purposes of the invention is contemplated.

The composite keyway provision may include a combination of even and odd number recesses such that an angular offset is inevitable. In such instances it is preferable that a progressive differential relationship be provided. With a sufficient number each of first and second recesses the angle of differentiation can be reduced to one such as five degrees (for an arrangement of twelve flats, and six barrel recesses in asymmetrical arrangement). Then, with the nozzle snugly bottomed onto its seat within the injector barrel the best-matched keyway will be almost optimal, so that little or no adjustment by rotation of the nozzle is required, and the nozzle can be maintained in a seated condition, with a locking pin inserted into the matched-up keyway. Thus, the nozzle is firmly secured against the occurrence of any backing-off from its seat, towards the mold gate.

Inward motion of the locking pin is restricted by the bottom of the keyways, which may be bounded by a radially extending shoulder portion of the nozzle tip, which shoulder portion substantially fills the barrel recess.

BRIEF DESCRIPTION OF THE DRAWINGS

Certain embodiments of the invention are described by way of illustration, without limitation of the invention thereto, other than as set forth in the following claims, reference being made to the accompanying drawings, wherein:

DETAILED DESCRIPTION OF THE INVENTION

Figures 1, 2, 3, 4:
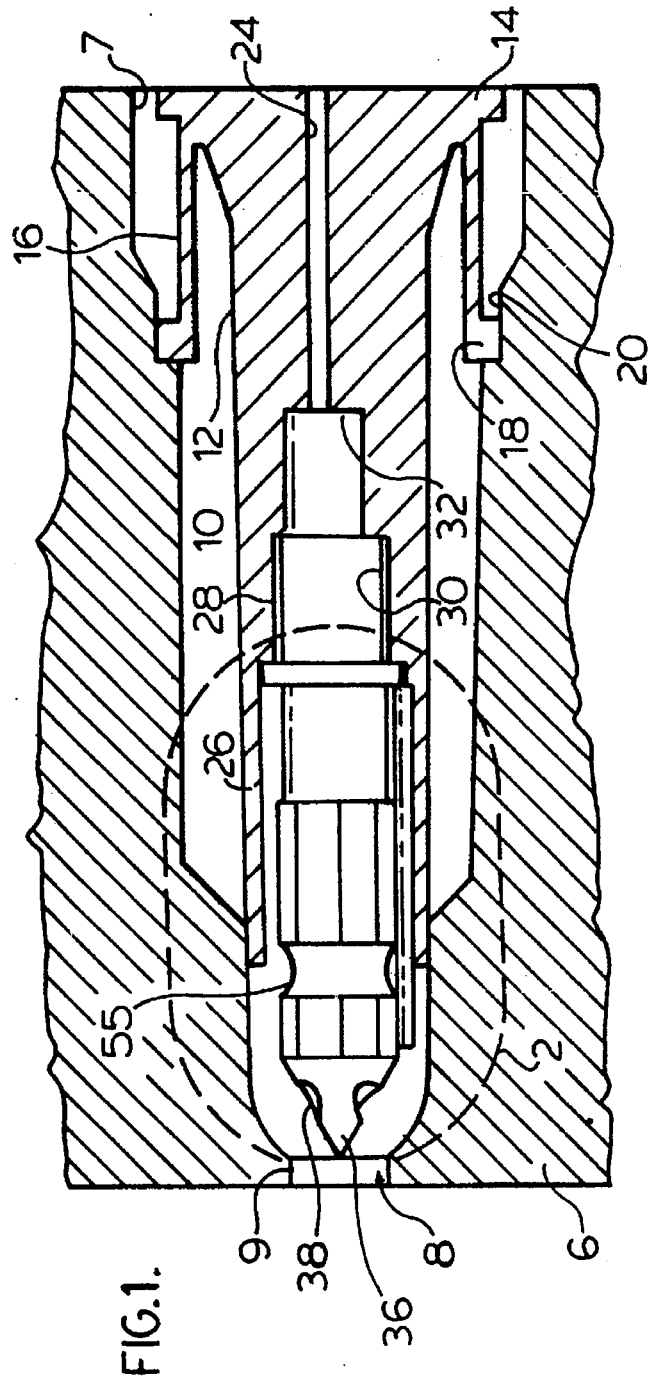
FIG. 1 is a side view, in part diametrical section showing a portion of an injector plate, having an injection nozzle assembly embodiment in accordance with the present invention.
FIG. 2 is an enlarged view of the portion 2 of the FIG. 1 nozzle assembly.
FIG. 3 is a view taken at 3—3 of FIG. 2.
FIG. 4 is a view corresponding to FIG. 3 of a different nozzle tip locking arrangement for a nozzle assembly.

Referring first to FIG. 1 the portion of an injector plate 6 has a housing recess 7 for an injector nozzle assembly 10. The plate 6 has a gate 8 surrounded by an annular gate land 9, the water cooling for which is not shown. The injector plate 6 may contain a plurality of injector nozzle assemblies 10, only one being illustrated.

The injector nozzle assembly 10 has a stainless steel nozzle housing 12, with a piston-like rear-end portion 14 having a forwardly extending skirt portion 16. The skirt portion 16 is bounded by a ring portion 18, that seats into a recess 20 of the mold.

A barrel portion 22 extends forwardly of the rear end portion 14, having a central bore 24 that connects to the nozzle tip 26. The nozzle tip 26 may be of a copper-beryllium alloy.

The nozzle tip 26 has a threaded base portion 28 that engages the threads 30 of the barrel portion 22 of the nozzle housing, to enable the seating of the nozzle proximal end 32 in sealing relation with the bore 24 of the nozzle housing barrel portion 22. A relieved portion 33 of nozzle tip 26 is bounded by a shoulder 35, adjacent the threads 30. The distal (front) end of the nozzle tip 26 is shown as having a 12-point hexagon cross section, with 12 flats. This "hex-head" portion 34 extends forwardly of the barrel portion 22. An adjacent conical nose portion 36 of nozzle tip 26, has two discharge passages 38 thereof connecting with a central passage 40 and the bore 24 of barrel portion 22.

Referring to the enlargement in FIGS. 2 and 3, the barrel portion 22 has a series of recesses 44 in the inner surface 46 thereof in inward facing relation with the nozzle tip 26. At the recess "A", the opposed flat 50 of the 12-point hex is in substantial alignment with the edges of recess 44, to form a composite keyway comprising recess 44(A) and opposed flat 50, within which is accommodated a tubular spring pin key 54. An annular recess 55 in the nozzle tip 26 facilitates withdrawal of the spring pin key 54.

Referring to FIG. 3, it will be seen in this illustrated embodiment of an injector barrel 22 having four recesses 44, that a differential-producing asymmetry may be achieved by the arrangement of one recess substantially at the six-o-clock position; a second at a position 7½ degrees (clockwise) before the nine-o-clock position; a third recess positioned 15 degrees (clockwise) before the twelve-o-clock position, and the fourth recess positioned 22½ degrees (clockwise) before the three-o-clock position.

With the first (six-o-clock) recess having one of the "hex" flats in precisely aligned relation to form an optimal combination keyway, as evidenced by the presence of key 54, two of the other recesses are but 7½ degrees out of optimal alignment, while the fourth recess is 15 degrees out of alignment. In the case of the two close-to-alignment recesses, one is in a "leading" relationship while the other is in a "trailing" relationship, thus giving the option of either slightly backing-off the nozzle or of slightly tightening it further onto its seat, each by a mere 7½ degree movement, in the event that the seating condition of the nozzle should require improvement in a tightening or in a backing-off sense.

The selection of an injector arrangement with six barrel recesses being provided further reduces the required angular displacement to a mere 5 degrees in order to ensure one optimally aligned keyway. The adoption of five recesses in regularly spaced relation about the barrel portion 22 will also achieve the effect of differentiated alignment between the recess and the "hex" flats, in achieving match-up of a desired composite keyway.

Referring to the FIG. 4 embodiment, a single composite keyway 60 is shown, having a thermoplastic key 62 in locking relation therein, to prevent relative rotation between the nozzle tip 26 and the nozzle housing portion 12, and any consequent backing off of the nozzle tip 26 towards the gate 18.

It will be understood that the geometry of the nozzle tip and its locking key is influenced by the degree of sensitivity of the plastic melt, and the tolerance of the mold to heat transfer in the zone of the locking key, by conduction of heat across the keyway by the key. The tight space limitations also are significant in influencing the geometry of the keyway and key.

What is claimed:

1. A mold for plastic and an injector assembly therefor, in combination, for use in a molding machine for molding plastic, the injector assembly comprising a nozzle assembly having an elongated nozzle housing portion with an internally threaded hollow barrel, for passage of the plastic; a hollow injector nozzle tip having a threaded body portion thereof located within the barrel for securing the nozzle tip in coaxial threaded relation in the barrel; a portion of the nozzle tip within the barrel having a radial clearance from the barrel; the nozzle tip extending outwardly beyond the nozzle housing; at least one composite keyway first recess portion in the barrel located in inward facing relation with the nozzle tip; at least one composite keyway recess second portion in the nozzle tip in facing relation with said at least one first recess portion, said first and said second at least one recess portions when in substantial aligned relation forming a composite keyway to receive a key member; said key member in close fitting inserted relationship located in said keyway, to immobilize said nozzle tip in relation to said housing.

2. The mold as set forth in claim 1, having a single said composite keyway.

3. The mold as set forth in claim 1, having a plurality of said keyway recess portions.

4. The mold as set forth in claim 1, said key member being characterized by low thermal conductivity thereacross.

5. The mold as set forth in claim 4, said key member comprising a tubular spring pin.

6. The mold as set forth in claim 4, said key member being of plastic having predetermined strength and thermal characteristics.

7. The mold as set forth in claim 3, a plurality of said at least one recess first portions, and a plurality of said at least one recess second portions arranged to provide a plurality of composite keyways.

8. The mold as set forth in claim 7, selected ones of said recesses being arranged in mutual asymmetrical relation in order to provide a series of approximately aligned said composite keyways in differing degrees of alignment.

9. The mold as set forth in claim 1, one said composite keyway recess portion comprising a flat portion in aligned facing relation spaced from a re-entrant said recess portion.

10. The mold as set forth in claim 9, said flat portion comprising one flat of a twelve-point hexagon.

11. The mold as set forth in claim 10, said twelve-point hexagon of said nozzle tip extending forward in protruding relation beyond said barrel.

12. The mold as set forth in claim 1, in combination with a molding machine having said mold installed therein.

* * * * *